United States Patent
Kojima et al.

(10) Patent No.: US 8,479,005 B2
(45) Date of Patent: Jul. 2, 2013

(54) APPLET, ARCHIVE FILE GENERATION METHOD, ARCHIVE FILE GENERATION PROGRAM, AND ARCHIVE FILE GENERATION DEVICE

(75) Inventors: Hisashi Kojima, Kawasaki (JP); Yuko Nakayama, Kawasaki (JP); Ikuya Morikawa, Kawasaki (JP); Yuji Yamaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1024 days.

(21) Appl. No.: 11/651,801

(22) Filed: Jan. 9, 2007

(65) Prior Publication Data
US 2007/0169041 A1    Jul. 19, 2007

Related U.S. Application Data

(63) Continuation of application No. PCT/JP2004/011590, filed on Aug. 12, 2004.

(51) Int. Cl.
*H04L 9/32* (2006.01)
*G06F 7/04* (2006.01)

(52) U.S. Cl.
USPC ............... 713/176; 713/181; 726/26; 726/30

(58) Field of Classification Search
USPC ............ 713/164–167, 176, 180, 181; 726/26, 726/27, 30; 717/124, 126–127, 130–131, 717/134–165
See application file for complete search history.

(56) References Cited

U.S. PATENT DOCUMENTS

| | | | |
|---|---|---|---|
| 5,892,904 A * | 4/1999 | Atkinson et al. | 726/22 |
| 5,958,051 A * | 9/1999 | Renaud et al. | 726/22 |
| 6,317,742 B1 * | 11/2001 | Nagaratnam et al. | 1/1 |
| 6,430,608 B1 * | 8/2002 | Shaio | 709/217 |
| 6,694,434 B1 * | 2/2004 | McGee et al. | 713/189 |
| 6,766,353 B1 * | 7/2004 | Lin et al. | 709/203 |
| 6,910,128 B1 * | 6/2005 | Skibbie et al. | 713/170 |
| 7,069,554 B1 * | 6/2006 | Stammers et al. | 717/178 |
| 7,590,863 B2 | 9/2009 | Lambert | |
| 2002/0161996 A1* | 10/2002 | Koved et al. | 713/150 |
| 2003/0061487 A1* | 3/2003 | Angelo et al. | 713/176 |

(Continued)

FOREIGN PATENT DOCUMENTS

| | | |
|---|---|---|
| JP | 2000-331088 | 11/2000 |
| JP | 2003-283494 | 10/2003 |

OTHER PUBLICATIONS

"Jar File Overview," Jar Guide, Sun Microsystems Inc, 1999.*

(Continued)

*Primary Examiner* — Darren B Schwartz
(74) *Attorney, Agent, or Firm* — Fujitsu Patent Center

(57) ABSTRACT

There is disclosed a Java applet that causes a computer to execute plural predetermined Java applet programs. The Java applet is attached with an electronic signature for certifying an origin. The Java applet causes the computer to execute: an alteration detection step that detects alteration to deployment information, based on the identification information for detecting alteration to the deployment information defining respective locations of the plural predetermined Java applet programs; a load program startup step that starts a load program for loading the plural predetermined Java applet programs; and a load step that makes the started load program load the plural predetermined Java applet programs on the basis of the deployment information unless alteration is detected by the alteration detection step.

17 Claims, 19 Drawing Sheets

U.S. PATENT DOCUMENTS

| | | | | |
|---|---|---|---|---|
| 2003/0105888 | A1* | 6/2003 | Connelly et al. | 709/331 |
| 2004/0019596 | A1* | 1/2004 | Taylor et al. | 707/100 |
| 2004/0039926 | A1* | 2/2004 | Lambert | 713/189 |
| 2004/0123270 | A1* | 6/2004 | Zhuang et al. | 717/118 |
| 2005/0005099 | A1* | 1/2005 | Naruse et al. | 713/161 |
| 2005/0010794 | A1* | 1/2005 | Carpentier et al. | 713/193 |
| 2005/0172123 | A1* | 8/2005 | Carpentier et al. | 713/165 |
| 2005/0278718 | A1* | 12/2005 | Griffith et al. | 717/175 |

OTHER PUBLICATIONS

"JavaScript to Java Communication (Scripting)," Sun Microsystems, 2002.*

Kojima, H. et al. "Cozilet: transparent encapsulation to prevent abuse of trusted applets," Computer Security Applications Conference, ACSAC'04, pp. 146-155, Dec. 6-10, 2004.*

English translation of International Preliminary Report on Patentability; Apr. 24, 2007.

Kojima et al.; "Security of Java Package System;" IBM Research, Tokyo Institute of Technology; Oct. 1998; pp. 171-176.

Hiroshi Maruyama et al.; "Java ActiveX;" Tokyo Research Laboratory, IBM Research and Graduate School of Information Science and Engineering, Tokyo Institute of Technology; Vo. 16, No. 4; Jul. 1998; pp. 23-32.

European Search Report mailed by EPO and corresponding to European application No. 04771565 on Feb. 21, 2011.

Li Gong: "Secure Java class loading", Internet Citation, Nov. 1998, XP002177474, Retrieved from the Internet: URL:http://citesser.nj.nec.com/ gong98secure.html [retrieved on Sep. 14, 2001]; pp. 56-61.

* cited by examiner

FIG. 4

SPECIAL FORMAT JAR FILE

META-INF/MANIFEST.MF
com/aaa/labs/sec/cozilet/Cozilet.class
com/aaa/labs/sec/cozilet/CoziletClassLoader.class
com/aaa/labs/sec/cozilet/CoziletData.class
com/aaa/labs/sec/cozilet/target.jar
com/aaa/labs/sec/cozilet/descriptor.jar

FIG. 5

ELECTRONICALLY SIGNED SPECIAL FORMAT JAR FILE

META-INF/MANIFEST.MF
META-INF/SIGNER.SF
META-INF/SIGNER.RSA
com/aaa/labs/sec/cozilet/Cozilet.class
com/aaa/labs/sec/cozilet/CoziletClassLoader.class
com/aaa/labs/sec/cozilet/CoziletData.class
com/aaa/labs/sec/cozilet/target.jar
com/aaa/labs/sec/cozilet/descriptor.jar

FIG. 6

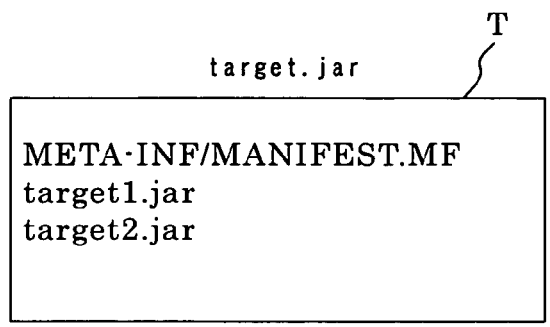

FIG. 7 descriptor.jar — D

```
META-INF/MANIFEST.MF
cozilet.properties
```

FIG. 8 cozilet.properties — 23

```
main_class=jp.example.SomeApplet
class_path=htttps://www.example.jp/outerl.jar;file:///c|/sample/outer2.jar
library_path=C:\\sample\\native.dll
trusted_url=https://www.example.jp/
exclusive_mode=on
```

FIG. 9

CoziletData.java

```
package com.aaa.labs.sec.cozilet;

final class CoziletData {

// SHA1 hash value of target.jar
    private static final byte[ ] inner_hash      = { 45, 35, ..., 87};
  // SHA1 hash value of all files in class_path
    private static final byte[ ] outer_hash      = { 43, 25, ..., 97};
  // SHA1 hash value of descriptor.jar
    private static final byte[ ] descriptor_hash = { 10, 51, ..., 35};

CoziletData.java

```
package com.aaa.labs.sec.cozilet;

final class CoziletData {

// SHA1 hash value of target.jar
    private static final byte[ ] inner_hash       = { 45, 35, ..., 87};
  // SHA1 hash value of all files in class_path
    private static final byte[ ] outer_hash       = { 43, 25, ..., 97};
  // entire value of descriptor.jar
    private static final byte[ ] descriptor_value = { 23, 46, ..., 15};

Cozilet.java

```java
package com.aaa.labs.sec.cozilet;

import java.applet.Applet;
import java.lang.reflect.Method;
import java.lang.reflect.InvocationTargetException;

public final class Cozilet extends Applet { private final Appledt targetApplet = null;

// omitted

// Wrapper method
    Public void doSomething(String Str)
            throws ClassNotFoundException, NoSuchMethodExeption,
                IllegalAccessException, InvocationTargetException {
        Class[ ] paramTypes = new Class[1];
        paramTypes[0] = java.lang.String.class;
        Method method = targetApplet.getMethod("doSomething", paramTypes);
        Object args[ ] = new Object[1];
        args[0] = str;
        method.invoke(targetApplet. Args);
    }

Cozilet.java

```java
package com.aaa.labs.sec.cozilet;

import java.applet.*;
import java.io.*;

public final class Cozilet extends Applet {

// omitted private void writeObject(ObjectOutputStream o)
               throws IOException {
      throw new NotSerializableException( );
   } private void readObject(ObjectInputStream o)
               throws IOException, ClassNotFoundExpection {
      throw new NotSerializableException( );
   }

Private Object writeReplace( )
               throws ObjectStreamException {
      throw new NotSerializableException( );
   } private Object readResolve( )
               throws ObjectStreamException {
      throw new NotSerializableException( );
   }

}
```

APPLET, ARCHIVE FILE GENERATION METHOD, ARCHIVE FILE GENERATION PROGRAM, AND ARCHIVE FILE GENERATION DEVICE

This is a Continuation of International Application No. PCT/JP2004/11590 filed on Aug. 12, 2004.

TECHNICAL FIELD

The present invention relates to a Java applet and particularly to a technique for preventing illicit use of a Java applet.

BACKGROUND ART

Conventional techniques are provided for carrying out processing in a client terminal by allowing a JRE (Java Runtime Environment) installed in a Web application (Web browser or the like) in a client terminal to execute a Java applet (hereinafter an applet) downloaded via an electric communication channel or the like.

In the JRE for executing such an applet when processing is performed with use of the applet, the applet is inhibited from making an action which may damage users for safety reasons.

FIG. 21 is a conceptual view for depicting normal processing in case of executing an applet without an electronic signature. This figure shows a case that an attacker is going to illicitly access a protected system resource (data, personal information, etc.) 13 in a client terminal C with use of an illicit JAR file evil.jar 91. In this case, the JAR file evil.jar 91 is not electronically signed.

When a user of the client terminal C accesses a Web site of the attacker, a Web browser 11 downloads HTML data "evil.html" from the attacker's Web site via the Internet (S71).

Based on a tag of the illicit applet included in the "evil.html", the Web browser 11 requests an applet startup section 12a of a JRE 12 to start up the illicit applet (S72). The applet startup section 12a loads the JAR file evil.jar 91 on the basis of the request (S73).

In this case, the illicit JAR file evil.jar 91 is regarded to be untrustworthy because no electronic signature is attached to certify the origin thereof. Therefore, the access request (S74) of the illicit JAR file evil.jar 91 (illicit applet) for accessing the protected system resource 13 is inhibited by the security manager 12b(S75).

Thus, under access restriction of the security manager 12b, the protected system resource 13 is inaccessible by use of an applet given no origin certificate, and users do not suffer damage.

The access restriction as described above constitutes obstacles to development of a Web application in some cases. For example, there is a case that an electronic government system requires a user to attach an electronic signature to an application form or the like with use of information stored in a local device in a client terminal C. However, access to a local device on the side of a client terminal by use of an applet is normally inhibited as described above, so that a system as described above cannot be achieved.

A mechanism has hence been prepared to enable a user to permit an applet to execute an action (file access or command execution) normally inhibited for the applet if an origin of the applet is certified by an electronic signature or the like. A commonly employed method for certifying an origin is to attach an electronic signature to an applet, as described above.

According to this kind of mechanism, if an applet certified with an electronic signature (hereinafter an electronically signed applet) is loaded by the JRE 12, a dialog which dynamically requests release of security restriction is displayed when executing the applet. A user can thus be invited to chose whether the release should be permitted or not. This is advantageous in that the user can save labor of changing security settings in advance.

FIG. 22 is a conceptual view for depicting processing in case of executing an electronically signed applet. This figure shows a case where foo.jar 93 and bar.jar 92 are deployed as electronically signed applets together with an HTML file "goodj.html". In the figure, framing with double lines means that framed items have been electronically signed.

When the "goodj.html" on the Web site is accessed by the user of the client terminal C, the Web browser 11 downloads the HTML file "goodj.html" via the Internet N (S81).

The Web browser 11 requests the applet startup section 12a in the JRE 12 to start up a related applet on the basis of a tag of the applet included in the "goodj.html" (S82). The applet startup section 12a loads the JAR files bar.jar 92 and foo.jar 93 on the basis of the request (S83).

The loaded JAR files bar.jar 92 and foo.jar 93 have been attached with electronic signatures to certify origins. Therefore, the applet startup section 12a verifies contents of the signatures and displays a dialog which invites the user to check verification results (S84). If the user checks the verification result and determines the signatures to involve no problem, the security manager 12b regards the JAR files bar.jar 92 and foo.jar 93 to be trustworthy.

Applets regarded to be trustworthy can execute even actions which are normally inhibited. Accordingly, if an access request is issued for accessing a system resource 13 protected by such reliable applets under access restriction by the security manager 12b(S85), the access request is permitted (S86).

Although the mechanism described above to permit access from signed applets is useful, the mechanism involves a problem in that attackers may reuse signed applets to damage users by maliciously using functions of the applets.

A signed applet is constituted by reusable components such as signed JAR files. Therefore, an attacker can combine such signed JAR files with attacker's own components (illicit JAR files) to call methods of classes included in the signed JAR files or to alter fields. Thus, the attacker can try to use the signed JAR files for illicit purposes (so-called illicit reconstruction attacks) deviated from original concepts of creators of the signed JAR files.

FIG. 23 is a view for depicting an example of an illicit reconstruction attack as described above. This figure shows a case that an attacker obtains an electronically signed JAR file foo.jar 93 and conducts a reconstruction from the electronically signed JAR file and an illicit JAR file evil.jar 91 created by the attacker. The files are deployed together with an HTML file "evil2.html".

When the "evil2.html" on a Web site is accessed by the user of the client terminal C, the Web browser 11 downloads the HTML file "evil2.html" via the Internet N (S91).

The Web browser 11 requests the applet startup section 12a in the JRE 12 to start up a related applet, based on a tag of an applet included in the "evil2.html" (S92). The applet startup section 12a loads JAR files evil.jar 91 and foo.jar 93 on the basis of the request (S93).

In this case, the loaded JAR file foo.jar 93 is attached with an electronic signature to certify origin. Therefore, the applet startup section 12a verifies content of the signature and displays a dialog to invite a user to check the verification result (S94). If the user checks the verification result and determines the signature to involve no problem, the security manager 12b regards the JAR file foo.jar 93 to be trustworthy. On the other side, the evil.jar 91 not signed is regarded to be untrustworthy.

However, even actions which are normally inhibited for applets can be executed with respect to the JAR file foo.jar 93 regarded to be trustworthy. At this time, there is a risk that the evil.jar 91 may use the foo.jar 93 to allow an access request to be issued for accessing a protected system resource 13 (S95). The evil.jar 91 may then access the protected system resource 13 via the foo.jar 93 (S96).

An illicit reconstruction as described above enables illicit use of a "privileged code" as a mechanism which allows a trustworthy program to provide at self-responsibility an untrustworthy program with functions of the trustworthy program. Also enabled is an attack of freely controlling operation of a main logic by replacing any of classes of utility-like packages with respect to a program which distinguishes a package for executing the main logic from utility-like packages used on appropriate occasions. Further enabled is illicit rewriting of a resource included in a target program. Thus, users may be damaged.

Once a signed JAR file of this kind flows out, enhancing damages can hardly be reduced. If an electronic government system or the like allows attacks of this kind, foundation of an administrative system may be rocked. Therefore, there is an urgent need to establish technical countermeasures against attacks as described above.

DISCLOSURE OF THE INVENTION

Problems to be Solved by the Invention

The present invention has been made to address problems as described above and is directed to simply and securely prevent electronically signed applets from being illicitly reused.

Means for Solving the Problems

According to an aspect of the invention to address the above problems, there is provided a Java applet for causing a computer to execute plural predetermined Java applet programs, in which the Java applet is attached with an electronic signature for certifying an origin, and the Java applet causes the computer to execute: an alteration detection step that detects alteration to deployment information, based on the identification information for detecting alteration to the deployment information, defining respective locations of the plural predetermined Java applet programs; a load program startup step that starts a load program for loading the plural predetermined Java applet programs; and a load step that makes the started load program load the plural predetermined Java applet programs on the basis of the deployment information unless alteration is detected by the alteration detection step.

Thus, the invention is configured to load a plurality of predetermined Java applet programs by use of deployment information which has been checked to be not altered. As a result, different applets from applets intended by a creator of a corresponding Java applet are prevented from being loaded by use of altered Java applets. That is, electronically signed Java applets are simply and securely prevented from being illicitly reused.

Preferably, in the Java applet configured as described above, the identification information includes a hash value of the deployment information or part or all of data of the deployment information.

Also preferably, in the Java applet configured as described above, the identification information includes a hash value of each of the plural predetermined Java applet programs or part or all of data of each of the plural predetermined Java applet programs, and the alteration detection step detects alteration to each of the plural predetermined Java applet programs, based on the identification information.

In a configuration as described above, the plurality of predetermined Java applet programs can be loaded by use of deployment information upon checking that the deployment information and the plurality of predetermined Java applet programs have not been altered, based on identification information. As a result, different applets from applets intended by a creator of a corresponding Java applet are prevented from being loaded by use of altered Java applets and/or a plurality of altered predetermined Java applet programs.

Preferably, the Java applet configured as described above includes a transfer step that, if a call request for calling a method from a main class of the Java applet is issued by using a Java script, transfers a method call processing based on the call request, to a method corresponding to the called method in the plural predetermined Java applet programs.

In a configuration as described above, if a plurality of predetermined Java applet programs are not included in a list of operation applets which is held in the JRE, a method call processing based on a method call request using a Java script can be performed on the a plurality of predetermined Java applet programs, for example, by use of a wrapper method or the like.

Yet preferably, the Java applet configured as described above includes an applet stub setting step that sets an applet stub for the plural predetermined Java applet programs loaded by the load step, the applet stub having been set for the Java applet.

By thus setting an applet stub for a plurality of loaded Java applet programs, the plurality of predetermined Java applet programs can operate normally.

According to another aspect of the invention to address the above problems, there is provided a JAR file generation method in which a computer performs processing for generating a JAR file including a Java applet which causes the computer to execute plural predetermined Java applet programs, wherein the computer executes: an identification information generation step that generates identification information for detecting alteration to deployment information, based on the deployment information defining respective locations of the plural predetermined Java applet programs; and a JAR file generation step that generates a JAR file including the deployment information and the identification information, based on the deployment information and the identification information, the JAR file defining the identification information as a class file in a predetermined package.

Thus, identification information for detecting alteration to deployment information is defined as a class file in a predetermined package. As a result, if a JAR file concerned is electronically signed, illicit alteration to the identification information can be prevented by a mechanism of "same-package-same-signer".

Preferably, in the JAR file generation method configured as described above, the identification information includes a hash value of the deployment information or part or all of data of the deployment information.

Also preferably, in the JAR file generation method described above, based on the deployment information and the identification information, the JAR file generation step generates a JAR file including the deployment information, the identification information, a load program for loading the plural predetermined Java applet programs, and a startup program for starting up the load program, the JAR file defining the identification information, the load program, and the startup program as class files in the same package.

Thus, the JAR file generated by the JAR file generation step is configured to include a load program for loading the plural predetermined Java applet programs, and a startup program for starting up the load program. Therefore, a program which realizes a function of loading a plurality of predetermined Java applet programs need not be installed in advance in a terminal which downloads the JAR file. By merely downloading the JAR file, a plurality of predetermined Java applet programs can be safely loaded.

Preferably, in the JAR file generation method configured as described above, based on the plural predetermined Java applet programs, the deployment information, and the identification information, the JAR file generation step generates a JAR file including the plural predetermined Java applet programs, the deployment information, and the identification information, the JAR file defining the identification information as a class file in a predetermined package.

Thus, the JAR file generated by the JAR file generation step is configured to include the plurality of predetermined Java applet programs, the deployment information, and the identification information. Therefore, the plurality of predetermined Java applet programs need not be loaded from outside into a terminal which downloads the JAR file. By merely downloading the JAR file, the plurality of predetermined Java applet programs can be safely loaded.

Preferably, in the JAR file generation method configured as described above, the identification information includes a hash value of each of the plural predetermined Java applet programs or part or all of data of each of the plural predetermined Java applet programs.

Yet preferably, in the JAR file generation method configured as described above, based on the plural predetermined Java applet programs, the deployment information, and the identification information, the JAR file generation step generates a JAR file including the plural predetermined Java applet programs, the deployment information, the identification information, a load program for loading the plural predetermined Java applet programs, and a startup program for starting up the load program, the JAR file defining the identification information, the load program, and the startup program as class files in the same package.

In a configuration as described above, electronically signed Java applets can be simply and securely prevented from being illicitly reused without making any changes to the JRE which loads and executes a JAR file concerned.

According to still another aspect of the invention, there is provided a JAR file generation program that causes a computer to execute processing for generating a JAR file including a Java applet which causes the computer to execute plural predetermined Java applet programs, wherein the program causes the computer to execute: an identification information generation step that generates identification information for detecting alteration to deployment information, based on the deployment information defining respective locations of the plural predetermined Java applet programs; and a JAR file generation step that generates a JAR file including the deployment information and the identification information, based on the deployment information and the identification information, the JAR file defining the identification information as a class file in a predetermined package.

Preferably, in the JAR file generation program configured as described above, the identification information includes a hash value of the deployment information or part or all of data of the deployment information.

Also preferably, in the JAR file generation program configured as described above, based on the deployment information and the identification information, the JAR file generation step generates a JAR file including the deployment information, the identification information, a load program for loading the plural predetermined Java applet programs, and a startup program for starting up the load program, the JAR file defining the identification information, the load program, and the startup program as class files in the same package.

Also preferably, in the JAR file generation program as described above, based on the plural predetermined Java applet programs, the deployment information, and the identification information, the JAR file generation step generates a JAR file including the plural predetermined Java applet programs, the deployment information, and the identification information, the JAR file defining the identification information as a class file in a predetermined package.

Also preferably, in the JAR file generation program configured as described above, the identification information includes a hash value of each of the plural predetermined Java applet programs or part or all of data of each of the plural predetermined Java applet programs.

Also preferably, in the JAR file generation program configured as described above, based on the plural predetermined Java applet programs, the deployment information, and the identification information, the JAR file generation step generates a JAR file including the plural predetermined Java applet programs, the deployment information, the identification information, a load program for loading the plural predetermined Java applet programs, and a startup program for starting up the load program, the JAR file defining the identification information, the load program, and the startup program as class files in the same package.

According to still another aspect of the invention, there is provided a JAR file generation device that generates a JAR file including a Java applet which causes a computer to execute plural predetermined Java applet programs, the device including: an identification information generation section that generates identification information, based on deployment information defining respective locations of the plural predetermined Java applet programs; and a JAR file generation section that generates a JAR file including the deployment information and the identification information, based on the deployment information and the identification information, the JAR file defining the identification information as a class file in a predetermined package.

Preferably, in the JAR file generation device configured as described above, the identification information includes a hash value of the deployment information or part or all of data of the deployment information.

Also preferably, in the JAR file generation device configured as described above, based on the deployment information and the identification information, the JAR file generation section generates a JAR file including the deployment information, the identification information, a load program for loading the plural predetermined Java applet programs, and a startup program for starting up the load program, the JAR file defining the identification information, the load program, and the startup program as class files in the same package.

Also preferably, in the JAR file generation device configured as described above, based on the plural predetermined Java applet programs, the deployment information, and the identification information, the JAR file generation section generates a JAR file including the plural predetermined Java applet programs, the deployment information, and the identification information, the JAR file defining the identification information as a class file in a predetermined package.

Yet preferably, in the JAR file generation configured as described above, the identification information includes a hash value of each of the plural predetermined Java applet programs or part or all of data of each of the plural predetermined Java applet programs.

Preferably, in the JAR file generation device configured as described above, based on the plural predetermined Java applet programs, the deployment information, and the identification information, the JAR file generation section generates a JAR file including the plural predetermined Java applet programs, the deployment information, the identification information, a load program for loading the plural predetermined Java applet programs, and a startup program for starting up the load program, the JAR file defining the identification information, the load program, and the startup program as class files in the same package.

The Java applets and JAR file generation programs described above can be stored in recording media readable from a computer. The applets and programs can then be executable by the computer. Types of the recording media readable from a computer include portable storage media such as a CD-ROM, a flexible disk, a DVD disk, a magneto-optical disk, and a semiconductor device like an IC card, fixed storage devices such as a ROM, a RAM, and a magnetic recording device mounted on the computer, a database holding computer programs, and another computer with a database thereof.

Thus, each of steps in the JAR file generation method described above is realized by causing a computer to execute a JAR file generation program.

BRIEF DESCRIPTION OF THE DRAWINGS

FIG. 4 is a view for explaining a special applet program 24;

FIG. 5 shows a special format JAR file 2 having the configuration as shown in FIG. 4, which has been electronically signed;

FIG. 6 shows an example of a configuration of a JAR file T;

FIG. 7 shows a configuration of a JAR file (descriptor.jar) D;

FIG. 8 shows details of a deployment descriptor (cozilet-.properties);

FIG. 9 shows a source code of CoziletData.java in which hash values are embedded as identification information;

FIG. 10 shows a source code of CoziletData.java in which a deployment descriptor is embedded as identification information;

FIG. 16 shows an example of a source code of a Cozilet class (equivalent to a startup program) added with a wrapper method;

FIG. 17 shows an example of a source code of a Cozilet class equipped so as to invalidate serialization;

BEST MODE FOR CARRYING OUT THE INVENTION

Hereinafter, an embodiment of the present invention will be described in details with reference to the drawings.

If an item illicitly reconstructed from an electronically signed JAR file and an illicit JAR file is loaded to a client terminal in a JRE, such an illicit reconstruction of these JAR files cannot be detected by conventional techniques in the JRE side. This involves a case that processing or the like (access to a protected system resource or the like) permitted only for signed applets is illicitly executed. Therefore, applets need to be configured to be executed only in their own proper structures (according to intentions of creators of applets). A plurality of predetermined Java applet programs to be loaded according to intensions of creators of applets as described above will be hereinafter referred to as target applet programs.

Figure 1:
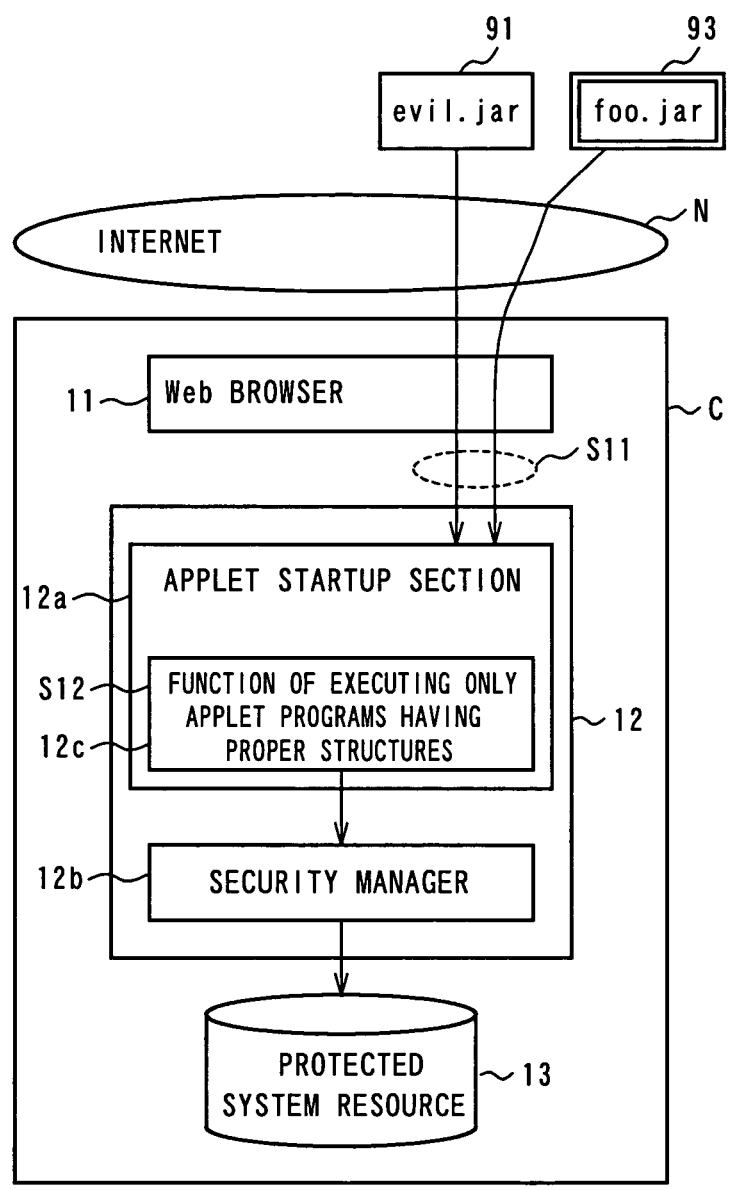
FIG. 1 is a conceptual view for depicting prevention of illicit use of electronically signed applets, according to an embodiment of the present invention.
Figure 23:
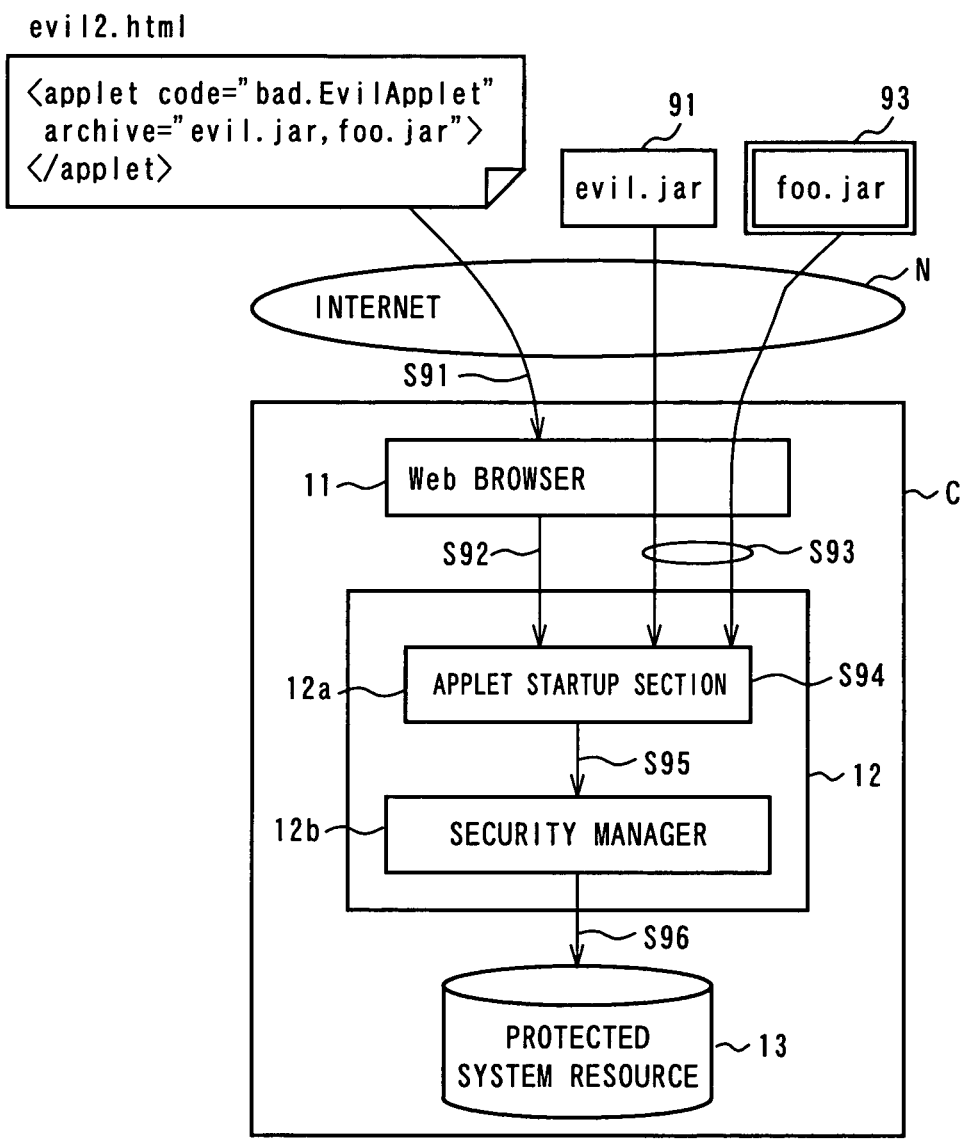
FIG. 23 is a view for explaining an example of an illicit reconstruction attack.

FIG. 1 is a conceptual view for depicting prevention of illicit use of electronically signed applets according to the present embodiment. In this figure, the same components as those shown in FIG. 23 are denoted at the same reference symbols, and description of those components will be omitted herefrom.

In the present embodiment, a JRE 12 is implemented with a function 12c of allowing applet programs to be executed only in their own proper structures. As a result, if an illicitly reconstructed JAR file (for example, a reconstructed file from a foo.jar 93 as a signed JAR file and an implicit JAR file evil.jar 91) is loaded in a JRE 12 (S11), the function 12c to allow applet programs to be executed only in their proper structures prevents illicit use of processings permitted for signed applets (S12).

Described below are three major examples of the configuration in which the JRE 12 in the client terminal C is implemented with the function 12c for allowing applet programs to be executed only in proper structures. A configuration (1) is to download an applet and the like (e.g., an applet and related data) for realizing the function 12c from outside of the client terminal C and to start up the applet and the like in the JRE 12. Another configuration (2) is to download part of an applet program and the like for realizing the function 12c from outside of the client terminal C and to deploy in advance the other part of the applet program inside the client terminal C. In yet another configuration (3), of an applet and the like for realizing the function 12c, only data to be deployed outside the client terminal C is deployed outside, and the other items such as an applet program and the like are deployed in advance inside the client terminal C.

Described first will be the configuration (1) in which an applet program and the like (e.g., an applet program and related data) for realizing the function 12c for allowing applet programs to be executed only in proper structures are downloaded from outside of the client terminal C and are started up in the JRE 12.

Figure 2:
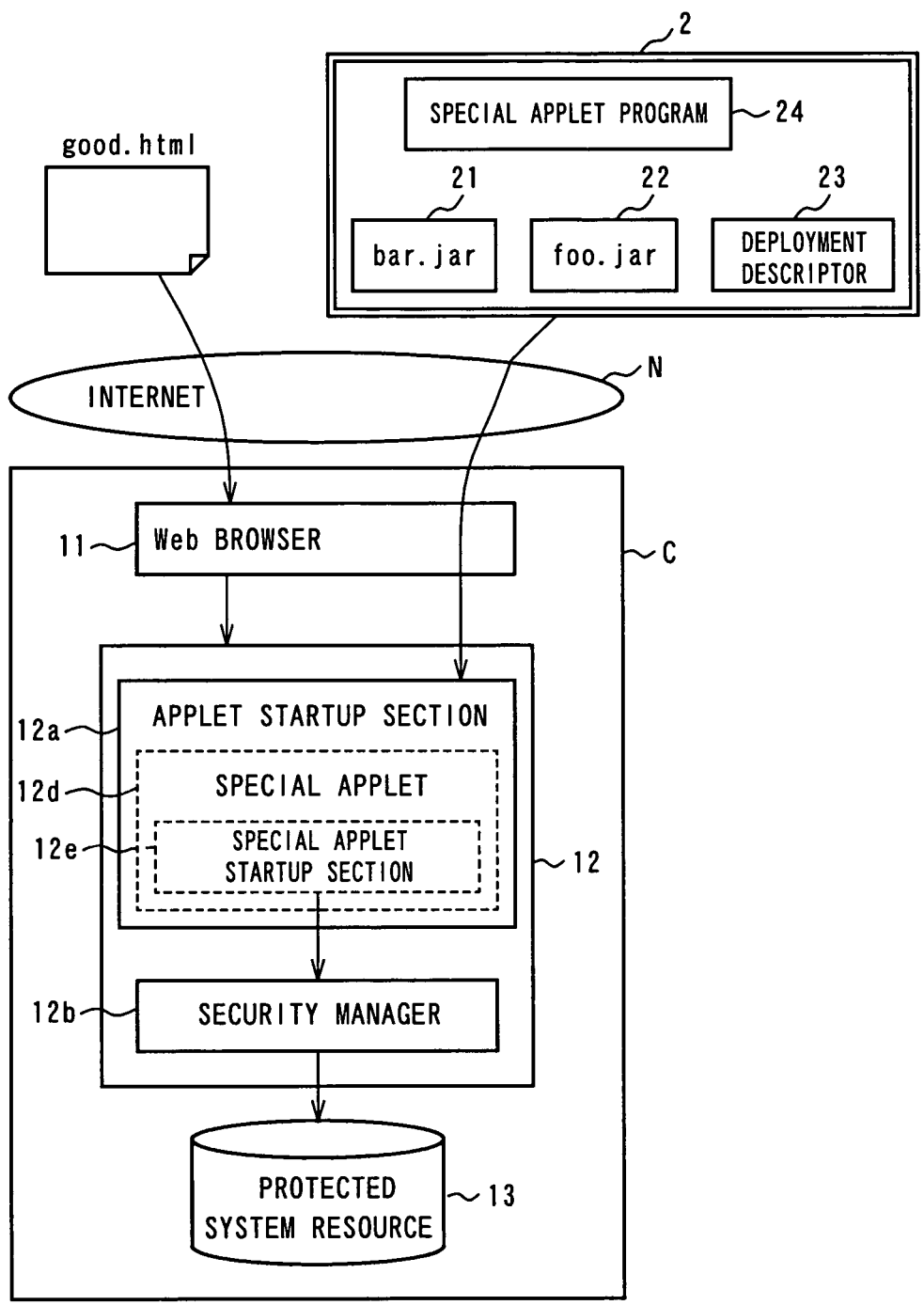
FIG. 2 shows an example of a specific configuration for preventing illicit use of electronically signed applets, as shown in FIG. 1.

FIG. 2 shows an example of a specific structure for preventing illicit use of electronically signed applets shown in FIG. 1. In this figure, the same components as those shown in FIG. 23 are denoted at the same reference symbols, and description of those components will be omitted herefrom.

In the configuration shown in FIG. 2, illicit use of functions of an electronically signed applet is prevented by use of a special format JAR file 2 which has been electronically signed and has a special internal structure. More specifically, the special format JAR file 2 includes a bar.jar 21 and a foo.jar 22 as target applet programs, a deployment descriptor (equivalent to deployment information) 23 defining location of each of the target applet programs (a plurality of predetermined Java applet programs), and a special applet program 24. These items from the bar.jar 21 to the special applet program 24 each are not individually electronically signed but an electronic signature is attached to the whole JAR file including the items from the bar.jar 21 to the special applet program 24. The client terminal C has a similar structure to that of the conventional client terminal shown in FIG. 23.

If the special format JAR file 2 is loaded into the JRE 12 of the client terminal C, the special applet program 24 included in the loaded special format JAR file 2 is then executed by the applet startup section 12a so that a special applet 12d is started.

The special applet 12d thus started up has a special applet startup section 12e (equivalent to a load program) having a function of allowing applets to be loaded only in their own proper structures, based on the deployment descriptor 23 loaded into the JRE 12, included in the special format JAR file 2.

Owing to this configuration, the JRE 12 is implemented with the function of allowing applet programs to be executed only in proper structures. Thus, electronically signed applets are prevented from being illicitly reused.

Figure 3:
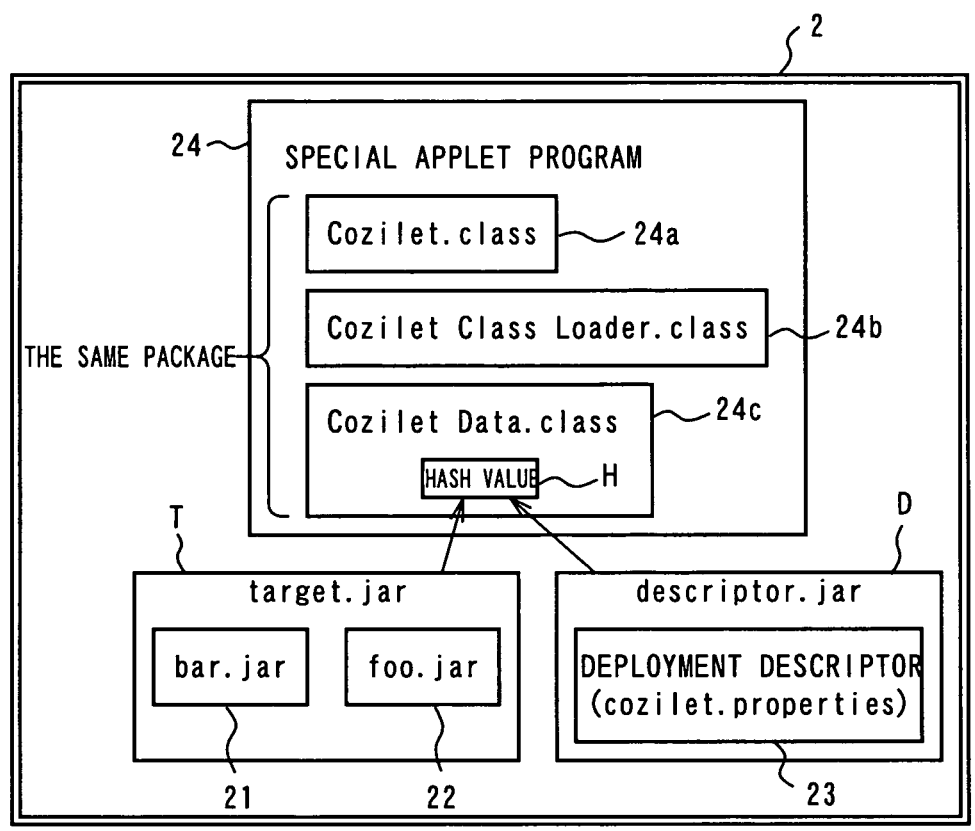
FIG. 3 is a view for explaining details of an internal configuration of a special format JAR file 2.

Further, description will now be made of an internal structure of the special format JAR file 2 to realize the function as described above in the JRE 12. As shown in FIG. 3, according to the present embodiment, the special format JAR file 2 has a structure including a special applet program 24, a JAR file (target.jar) T and a JAR file (descriptor.jar) D.

The special applet program 24 will be described first (see FIG. 4). The special applet program 24 includes Cozilet.class (equivalent to a startup program) 24a and CoziletClassLoader.class (equivalent to a load program) 24b, and CoziletData.class (equivalent to identification information) 24c. The Cozilet.class 24a is a class file of a main class of the special applet program 24 having a function of replacing itself with a target applet at the time of execution. The CoziletClassLoader.class 24b is a class file of a special class loader having a function of loading a program of a target applet based on the deployment descriptor. These class files all belong to the same package com.aaa.labs.sec.cozilet. Therefore, a mechanism of same-package-same-signer prevents attackers from illicitly replacing a group of these glass files by electronically signing the whole special format JAR file 2. FIG. 5 shows an electronic signature written on the special format JAR file 2 having the structure shown in FIG. 4.

Further, description will be made of a JAR file (target.jar) T included in the special format JAR file 2. FIG. 6 shows an example of a structure of the JAR file T. Specifically, a target applet refers to a group of class files and/or a group of resource files necessary to execute the target applet, and a group of JAR files storing these groups. In the figure, the JAR file T includes a group of JAR files target1.jar and target2.jar as target applet programs. In this case, the JAR file (target.jar) T is a JAR file having no signature. The target applet programs included in the JAR file (target.jar) T are loaded only by a special class loader (a load program) when executing the special applet program 24 but are not loaded by a standard class loader in the JRE. Therefore, the target applet programs can be prevented from being illicitly used by attackers.

Described next will be a JAR file (descriptor.jar) D included in the special format JAR file 2. FIG. 7 shows a structure of the JAR file (descriptor.jar) D. The JAR file (descriptor.jar) D includes a Java standard property file cozilet.properties 23 (see FIG. 3). In this case, the deployment descriptor cozilet.properties 23 is equivalent to deployment information concerning target applet programs. The JAR file D is a JAR file not signed. The JAR file D (equivalent to deployment information) is always included in the special format JAR file 2.

FIG. 8 shows details of the deployment descriptor (cozilet.properties) 23. The "main_class" property is a name of a main class of target applets. A special applet executes target applet programs on the basis of the property. The "class-path" property is a list of URLs where programs not included in the special format JAR file are deployed among target applet programs. The example of this figure describes a URL of outer1.jar deployed on a trustworthy site and a path of outer2.jar preinstalled on a local disk of a user. A special class loader loads target applet programs based on properties. To prevent illicit use by attackers, these URLs desirably refer to locations (such as an extension directory and the like) except locations loadable from a standard JRE.

The "library_path" property is a list of paths to locations where a group of native libraries necessary for execution of native methods are deployed among target applet programs. The native libraries need to be installed on a local disk. Therefore, URLs are not specified but paths on a local disk are specified. A special class loader loads the group of native libraries based on properties. To prevent illicit use by attackers, these paths desirably refer to locations (such as a system directory and the like) except locations loadable from a standard JRE.

The "trusted_url" property is a list of trustworthy URLs to which an HTML document should be deployed with a special applet embedded in the HTML document. Immediately after execution of the special applet, the special applet obtains an URL to which the HTML document including the embedded special applet itself has been deployed. The special applet compares the obtained URL with the URLs included in the property and can thus check whether or not the special applet itself is embedded in the HTML document deployed to trustworthy sites.

The "exclusive_mode" property is a flag which decides whether a function of preventing execution of untrustworthy applets should be made effective or not during execution of the special applet. If this property has a value of ON, the special applet makes the function effective. Otherwise, if the value of this property is OFF, the function is made ineffective.

Described next will be CoziletData.class 24*c* included in the special applet program 24. The CoziletData.class 24*c* is a class file including identification information for detecting alteration to target applet programs and deployment descriptors. FIG. 9 shows a source code CoziletData.java of a class CoziletData which embeds as the identification information SHA1 hash values H of target applet programs or deployment descriptors in constant fields. The CoziletData.class 24*c* can be generated by compiling this source code.

The CoziletData class includes three constant fields of inner_hash, outer_hash, and descriptor_hash. The inner_hash includes a SHA1 hash value of the target.jar T. The outer_hash includes a SHA1 hash value of the whole target applet programs deployed to URLs specified in the class_path property. The descriptor_hash includes a SHA1 hash value of the descriptor.jar D. The CoziletData class belongs to the same package com.aaa.labs.sec.cozilet as the group of class files as the other special applet programs. By electronically signing a special format JAR file, the mechanism of same-package-same-signer prevents attackers from carrying out illicit replacement.

Because the target.jar T and descriptor.jar D included in the special format JAR file are not class files but are resource files, the target.jar T and descriptor.jar D may be replaced illicitly by attackers. Hence, when a special class loader loads these resource files, the loader compares each of SHA1 hash values of the loaded resources with SHA1 hash values H included in constant fields in the CoziletData class. Thus, whether the resource files have been altered or not can be detected.

In the above example, the CoziletData.class 24*c* is configured to include SHA1 hash values H of the target.jar T and descriptor jar D. The CoziletData.class 24*c* is not limited to this configuration but may be configured to include constant fields which include part or all of data of the target.jar T and descriptor.jar D. FIG. 10 shows an example of a source code of the CoziletData.class 24*c* including a constant field descriptor_value which includes the descriptor.jar D itself. In this case, the special format JAR file 2 need not include the descriptor.jar D and can extract a value of the descriptor.jar D from the constant field descriptor_value when executing the special applet program 24.

Figure 11:
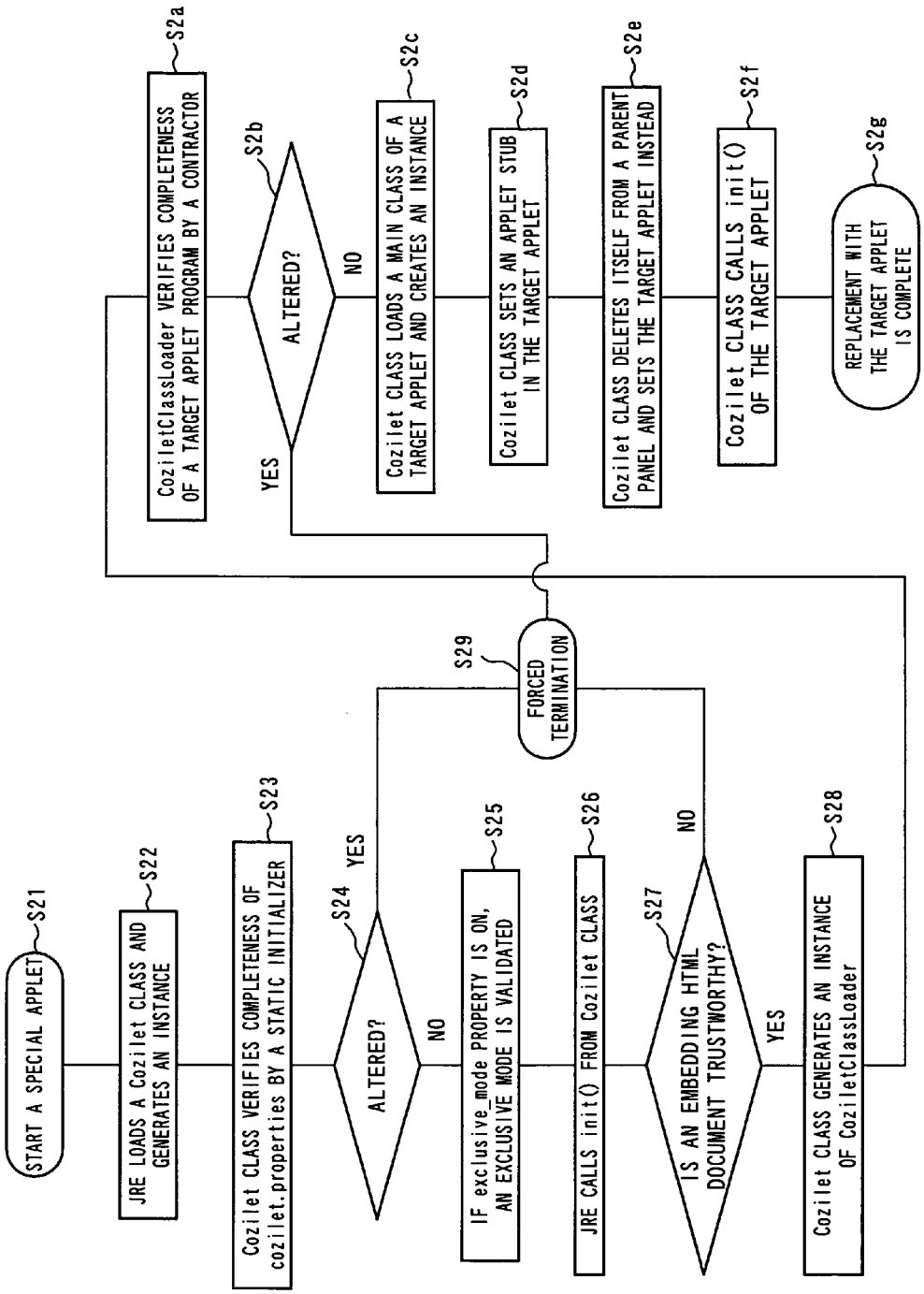
FIG. 11 is a flowchart from startup of a special applet until completion of replacement with a target applet.

Subsequently, operation of executing the above special applet program 24 in the JRE will be described with reference to a flowchart shown in FIG. 11.

At first, a special format JAR file 2 according to this embodiment is deployed, for example, on a server and is loaded in the JRE via a Web browser or the like. The special applet program 24 is then executed in the JRE.

Normally, a plurality of predetermined Java applet programs are started up by an HTML document including applet tags as follows:
<applet code="jp.example.SomeApplet"
archive="target1.jar,target2.jar"
width="400" height="400"></applet>

Meanwhile, in case of starting up a plurality of predetermined Java applet programs in the JRE with use of a special format JAR file 2 according to this embodiment, a special applet is deployed and started up in place of target applets (S21), by an HTML document including applet tags as follows:
<applet code="com.aaa.labs.sec.cozilet.Cozilet"
archive="cozilet.jar"
width="400" height="400"></applet>

Target applet programs may then be started up.

Subsequently, a Cozilet class 24*a* is loaded in the JRE and an instance is generated (S22). The Cozilet class extracts a cozilet.properties 23 included in the special format JAR file 2 by a static initializer. If alteration prevention has been provided by a CoziletData.class 24*c*, whether the cozilet.properties 23 has been altered or not is verified (alteration detection step: S23). If altered (S24, Yes), execution is forcedly terminated (S29). Otherwise, if not altered (S24, No), a java.util.Properties instance is generated from the cozilet.properties 23. This instance is called a cozilet deployment descriptor. Thus, alteration to deployment information is detected based on identification information for detecting alteration to deployment information which defines a location of each of a plurality of predetermined Java applet programs.

Next, a value of execlusive_mode property is referred to from the cozilet deployment descriptor. If the value is ON, the function of preventing execution of untrustworthy applets during execution of the special applet program 24 is made effective (S25). This function utilizes functions of restricting class loading and class definition in a Java virtual machine included in the JRE. The class loading restriction function can inhibit untrustworthy programs from loading classes included in a group of packages starting from character strings specified in a security property "package.access". The class definition restriction function can inhibit untrustworthy programs from defining a new class in a group of packages starting from character strings specified in a security property "package.definition". By setting values such as "java.", "javax.", "com.", and "org" in these properties, untrustworthy programs cannot load necessary classes (for example, java.applet.Applet classes) for execution. Consequently, those programs cannot be executed.

Next, the JRE calls init( ) in the Cozilet class (S26). According to the init( ) method, the Cozilet class compares the URL of the site deployed with the HTML document embedding the Cozilet class itself, with a list of URLs included as values in a trusted_url property of the cozilet deployment descriptor, to check whether the URL of the site deployed with the HTML document is trustworthy or not (S27). The URL of the site deployed with the embedding HTML document can be obtained from getDocumentBase( ) in a java.applet.Applet class. In this case, this URL needs only to match with any one of the URLs included in the trusted_url property. Alternatively, the URL may be compared in a manner of prefix searching. If the URL does not match with any URL included in the trusted_url property (S27, No), execution is forcedly terminated (S29).

If the check described above does not involve a problem (S27, Yes), the Cozilet class 24*a* generates an instance of a CoziletClassLoader class 24*b* as a load program for loading a plurality of predetermined Java applet programs (a load program startup step: S28). In a constructor, the CoziletClassLoader class 24*b* sets into a loadable state the target.jar T included in the special format JAR file 2, URLs specified in the class_path property of the cozilet deployment descriptor, and target applet programs existing on paths specified in the "library_path" property of the cozilet deployment descriptor. If alteration prevention has been provided by the CoziletData.class 24*c*, completeness of a target applet program is verified (S2*a*). If alteration has been detected (S2*b*, Yes), execution is forcedly terminated (S29).

If an instance of the CoziletClassLoader class 24*b* is generated successfully, the Cozilet class 24*a* transfers a name of a main class of a target applet obtainable from the main_class property of the cozilet deployment descriptor, as an argument, to the loadclass( ) of the CoziletClassLoader class 24*b*.

The Cozilet class 24a thereby calls and obtains a class instance of the main class of the target applet (a load step). That is, if no alteration is detected by the alteration detection step, the load program is let load a plurality of predetermined Java applet programs, based on deployment information. Further, constructors of class instances thereof are called by a mechanism of Java reflection, and obtains instances of main classes of the target applets (S2c).

Several processings of an applet (such as calling of getDocumentBase( ) or the like) are transferred to an applet stub. The applet stub is initially set in a special applet. The Cozilet class sets its own applet stub by calling setStub( ) of a target applet (S2d). The applet stub is necessary for properly executing a target applet. The applet stub is stored in a private field of the java.applet.Applet class. The Cozilet class 24a cannot access this field. If, in a Java virtual mechine, an instance of a Cozilet class of a special applet has been registered and a parent panel of the special applet has a function as an applet stub, the instance of the parent panel can be essily obtained from the Cozilet class. Therefore, this instance is set as an applet stub in the target applet (S2d).

If an applet is registered in the parent panel, the applet can be displayed on the browser and can process GUI events. However, a special applet has been initially registered in the parent panel. The Cozilet class 24a deletes its own instance registered in the parent panel and registers an instance of a main class of the special applet program 24 instead (S2e). As a result of this, GUI events sent from the JRE are notified not to the special applet program 24 but to the target applet. The target applet can then operate normally as applet.

Further, the Cozilet class 24a calls init( ) of a main class of the target applet (S2f). Afterwards, the target applet operates as an applet instead of the special applet. Thus, exchange of applets is finished (S2g).

Thus, this embodiment is configured such that a plurality of predetermined Java applet programs are loaded by deployment information which has been confirmed to have not been altered, on the basis of identification information. In this manner, alteration to a Java applet can be prevented from causing a different Java applet program to be loaded despite the intension of a creator of the Java applet. That is, electronically signed Java applets can be easily and securely prevented from being illicitly reused.

In addition, a public method of a special applet may be illicitly used by attackers. At the head of each method, a caller is tested by a stack test. More specifically, at the head of each method, checkPermission( ) of a java.security.AccessController class is called by transferring as an argument an instance of a java.security.AllPermission class. As a result of this, classes which do not have an access right AllPermission or attackers' classes in other words cannot call a public method of the special applet as described above. The access right to be transferred to checkPermission( ) need not always be AllPermission but an access right which merely hinders attackers from calling is satisfactory.

Figure 12:
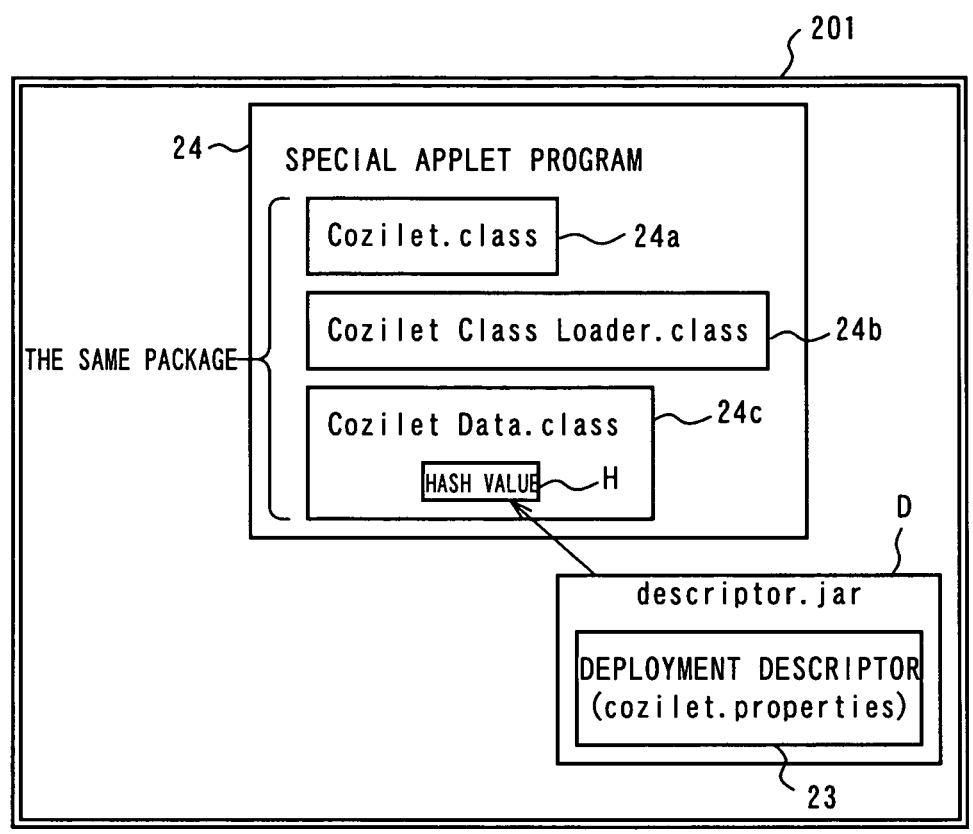
FIG. 12 is a view for explaining a configuration in which a special format JAR file does not include a JAR file (target.jar) T.

The special format JAR file 2 described above is configured to include Cozilet.class 24a as a startup program, CoziletClassLoader.class 24b as a load program, CoziletData.class 24c as identification information, a JAR file (target.jar) T, and a JAR file (descriptor.jar) D (see FIG. 3). However, this embodiment is not limited to this configuration. For example, the target.jar T need not always be included in the special format JAR file 2. If the JAR file (target.jar) T is configured not to be included in a special format JAR file like a special format JAR file 201 as shown in FIG. 12, the JAR file (target.jar) T needs to be deployed to a loadable location under the JRE.

Figure 13:
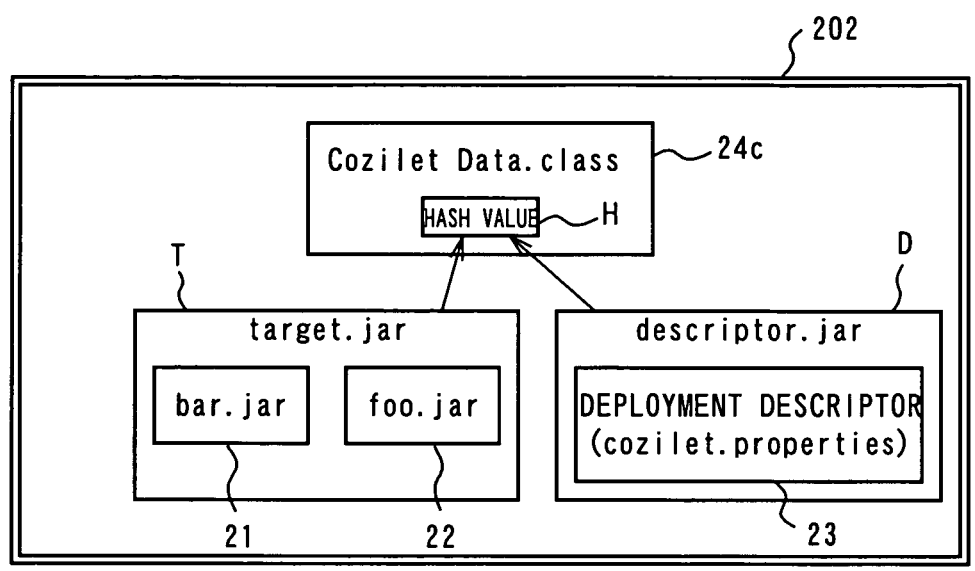
FIG. 13 is a view for explaining a configuration in which part of an applet and the like is downloaded from outside of a client terminal C and the other part is deployed in advance inside the client terminal C.
Figure 14:
FIG. 14 shows details of a configuration of a special format JAR file 202.

Another available configuration is that (2) part of an applet or the like which realizes the function 12c for executing applets only in their proper structures is downloaded from outside the client terminal C and remaining part thereof is deployed in advance inside the client terminal C (see FIG. 13). This figure shows a configuration in which a special format JAR file 202 includes CoziletData.class 24c as identification information, a JAR file (target.jar) T, and a JAR file (descriptor.jar) D. In case of using the special format JAR file 202 configured as shown in this figure, the Cozilet class 24a as a startup program and CoziletClassLoader class 24b as a load program are preferably stored in advance in a storage region of a client terminal provided with the JRE. FIG. 14 shows details of the configuration of the special format JAR file 202.

Figure 15:
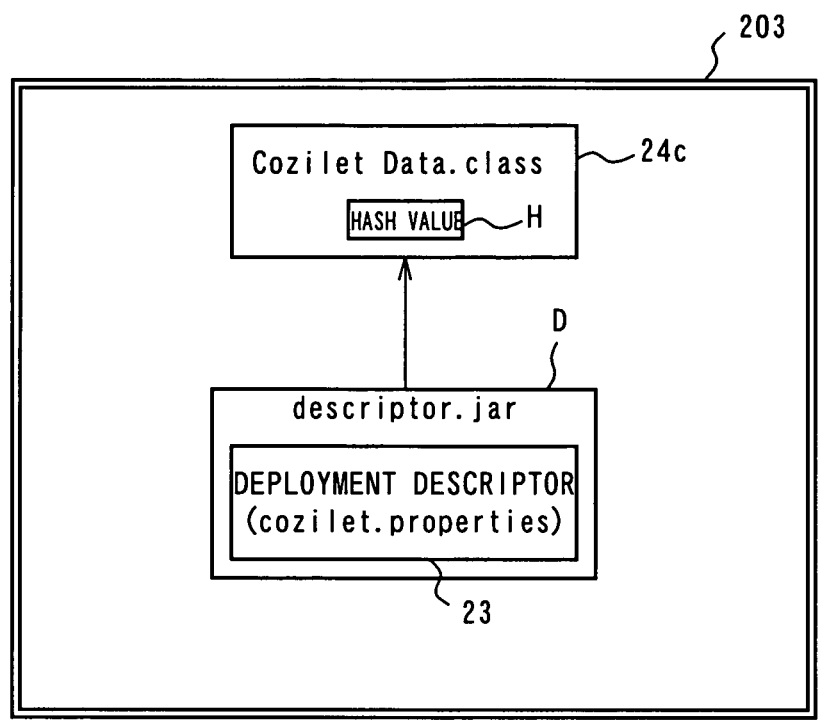
FIG. 15 shows a case where a special format JAR file 203 is configured so as to include CoziletData.class 24c and a JAR file (descriptor.jar) D as identification information.

Yet another available configuration is of a special format JAR file 203 which includes CoziletData.class 24c as identification information, and a JAR file (descriptor.jar) D (see FIG. 15). In this case, Cozilet class 24a as startup program and CoziletClassLoader class 24b as a load program need to be stored in advance in a storage region of a client terminal provided with the JRE. A JAR file (target.jar) T needs to be deployed to a loadable location under the JRE.

Thus, a special format JAR file according to the present embodiment can be divided into various formats as shown in FIGS. 3, 12, 13, and 15. However, special format JAR files of the formats described above have a common feature that all divisional componential elements are loaded in the JRE and respective steps shown in FIG. 11 are executed.

As described above, since a target applet is registered in place of a special applet in a parent panel, GUI events are properly notified. Therefore, methods of a target applet related to GUI are executed properly. However, methods of another target applet than the applet related to GUI are not properly executed in the JRE since the another target applet is not registered in a list of operating applets held internally in the JRE. Consequently, methods of a special applet are still executed. Hence, with respect to these methods, calling of each method of the special applet from the JRE is transferred to calling of a corresponding method of a target applet.

More specifically, the configuration is arranged as follows. A group of wrapper methods having the same signatures as a group of method signatures inputted as target applet deployment information are added to a main class of a special applet. The group of wrapper methods transfer processing for calling methods of themselves to methods having the same signatures of the main class of the target applet.

FIG. 16 shows an example of a source code of a Cozilet class (equivalent to a startup program) added with a wrapper method. Cozilet.class added with a wrapper method can be generated by compiling this source code. In the example of this figure, a wrapper method having the same signature as a method signature doSomething(java.lang.String) inputted as deployment information is added, a method of a main class of a target applet which have the same signature in the wrapper method is called by use of a mechanism of Java reflection.

When a method of an applet is called from JavaScript, this calling request is notified to the JRE. The JRE holds a list of operating applets and calls a method of a corresponding applet on the basis of this list. However, this applet list cannot be operated from a special applet. Hence, a wrapper method of a corresponding method is added to a main class of a special applet included in a special format JAR file as described above. Then, if the wrapper method is called, a script code can call a method of a target applet via the wrapper method.

In the present embodiment, each special applet is equipped so as to invalidate serialization of itself. If serialization of a special applet is effective, attackers can steal or alter values in private fields significant for security of special applets by use of an interface which carries out serialization or recovery from serialization. Since each java.applet.Applet class is equipped to be serializable, a Cozilet class which takes over this serializable class is also serializable. Hence, a Cozilet class 24a invalidates serialization of itself by equipping the Cozilet class 24a so as to forcedly generate an exception in methods related to serialization. FIG. 17 shows an example of a source code of a Cozilet class equipped so as to invalidate serialization.

Figure 18:
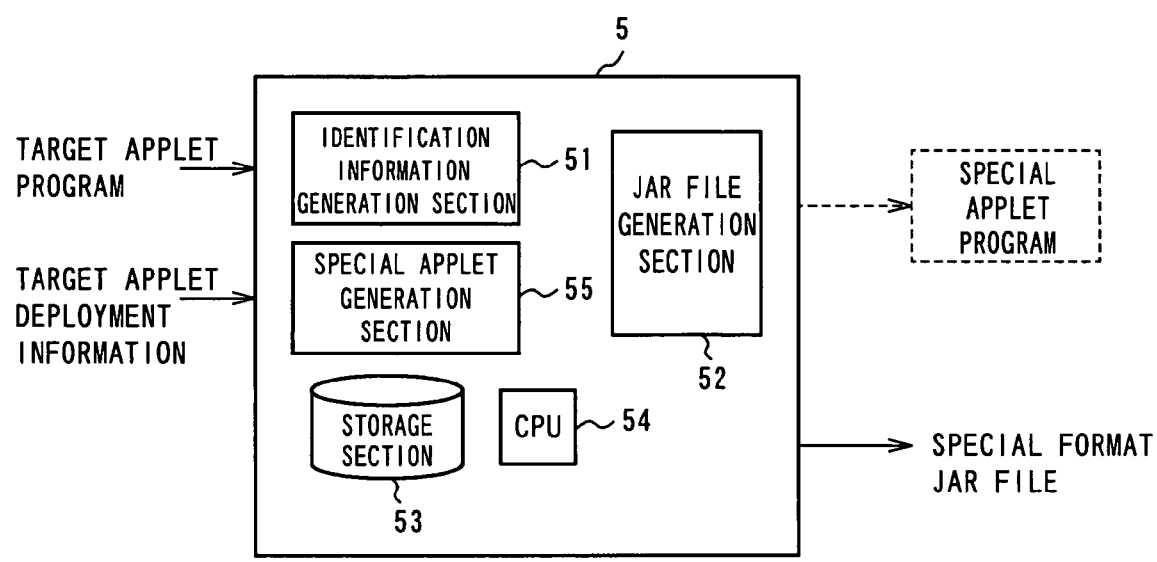
FIG. 18 is a view for explaining a JAR file generation device for generating a special format JAR file.

Described next will be a JAR file generation device 5 for generating special format JAR files (FIGS. 3, 12, 13, and 15) configured as described above with reference to FIG. 18. This device has a function of generating a JAR file including a Java applet to make a computer execute a plurality of predetermined Java applets. By inputting a target applet program and deployment information, the device converts the target applet program into a special format JAR file (encapsulation of a target applet program).

The JAR file generation device 5 according to the present embodiment is configured to include an identification information generation section 51, a JAR file generation section 52, a storage section 53, a CPU 54, and a special applet generation section 55.

The identification information generation section 51 functions to generate identification information for detecting alteration to deployment information, based on deployment information which defines locations of individuals of target applet programs (a plurality of predetermined Java applet programs).

Based on a plurality of predetermined Java applet programs, deployment information, and identification information, the JAR file generation section 52 generates a JAR file which includes the plurality of predetermined Java applet programs, the deployment information, the identification information, a load program for loading the plurality of predetermined Java applet programs, and a startup program for starting up the load program. In the generated JAR file, the identification information, load program, and startup program are defined as class files in the same package. The JAR file generation section 52 also functions to electronically sign the generated JAR file.

The special applet generation section 55 functions to generate Cozilet class 24a as a startup program described above and CoziletClassLoader. class 24b as a load program.

The storage section (recording medium readable from a computer) 53 is constituted by a storage region such as a RAM or ROM, and functions to store programs and various applets which are executed by the JAR file generation device 5. The CPU (computer) 54 functions to execute programs stored in the storage section 53, to perform various processings in the JAR file generation device 5.

Figure 19:
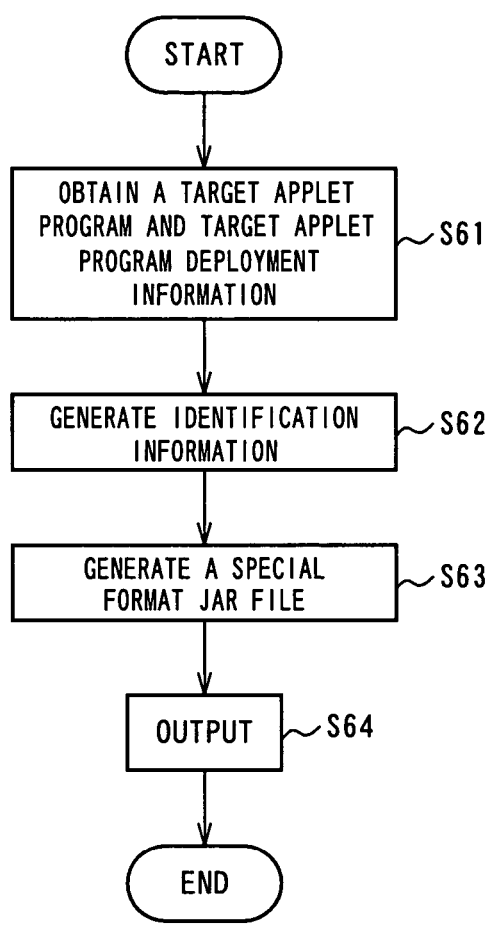
FIG. 19 is a flowchart for depicting a processing flow in the JAR file generation device.

FIG. 19 is a flowchart for depicting a processing flow (JAR file generation method) in the JAR file generation device 5 as described above. Description will now be made of a case of generating a special format JAR file of a data format shown in FIG. 3.

At first in the JAR file generation device 5, target applet programs (bar.jar 21 and foo.jar 22 in this case) and deployment information (storage locations or URLs) are obtained as input data. The deployment information defines locations of the target applet programs.

Next, based on the obtained deployment information, the identification information generation section 51 generates a JAR file (descriptor.jar) D for detecting alteration to the deployment information (an identification information generation step: S62). More specifically, the identification information generation section 51 can generate as identification information: a JAR file including a hash value of the deployment information or part or all of the deployment information; a JAR file including a hash value of each of the target applet programs or part or all of data of each of the target applet programs; a JAR file including hash values of both of the deployment information and the target applet programs or part or all of data of each.

Subsequently, based on the target applet programs (bar.jar 21 and foo.jar 22), deployment information and identification information, the JAR file generation section 52 generates a JAR file including: target applet programs; deployment information; identification information; a load program for loading the target applet programs; and a startup program for starting up the load program. At this time, the identification information, load program, and startup program are defined as class files in the same package in the generated JAR file as shown in FIG. 3 (a JAR file generation step: S63). Thus, identification information for detecting alteration to deployment information is defined as a class file in a predetermined package. In this manner, illicit alteration to the identification information can be prevented by the mechanism of "same-package-same-signer" even if a JAR file concerned has been electronically signed. In addition, a load program for loading a plurality of predetermined Java applet programs and a startup program for starting up the load program are included in a generated JAR file. This enables a plurality of predetermined Java applet programs to be loaded safely by merely downloading the JAR file even without installing in advance a program for realizing a function of loading a plurality of predetermined Java applet programs. That is, illicit reuse of electronically signed Java applets can be simply and securely prevented without making any change to the JRE in which a JAR file concerned is loaded and executed.

The JAR file generated as described above is electronically signed upon necessity by the JAR file generation section 52 and is then outputted (S64).

Each of the steps in the above JAR file generation method is realized by making the CPU 54 execute a JAR file generation program stored in the storage section 53.

Through the steps as described above, a special format JAR file as shown in FIG. 3 including a group of class files as a special applet program, target applet programs, and deployment information can be generated.

The JAR file generation section 52 can select a group of class files (e.g., a load program, a startup program, etc.) as a special applet program to be included in the special format JAR file, from data stored in advance in the storage section 53. Of course, special applets generated by the special applet generation section 55 can be generated as a group of class files to be included in the special format JAR file.

Alternatively, the JAR file generation section 52 can generate a special format JAR file so as not to include target applet programs, like the special format JAR file 201 having a data format shown in FIG. 12. In this case, based on deployment information and identification information, the JAR file generation section 52 generates a JAR file so as to include deployment information, identification information, a load program for loading target applet programs, and a startup program for starting up the load program. At this time, the JAR file generation section 52 defines the identification information, load program, and startup program as class files in the same package.

Alternatively, the JAR file generation section 52 can generate a special format JAR file so as not to include special applet programs (a load program, a startup program, etc.), like the special format JAR file 202 having a data format shown in FIG. 13. In this case, based on target applet programs, deployment information, and identification information, the JAR file generation section 52 generates a JAR file so as to include target applet programs, deployment information, and identification information. At this time, the JAR file generation section 52 defines the identification information as a class file in a predetermined package.

Further alternatively, the JAR file generation section 52 can generate a special format JAR file so as not to include neither target applet programs nor special applet programs (a load program, a startup program, etc.), like the special format JAR file 203 having a data format shown in FIG. 15. In this case, based on deployment information and identification information, the JAR file generation section 52 generates a JAR file so as to include deployment information and identification information. At this time, the JAR file generation section 52 defines the identification information as a class file in a predetermined package.

Figure 20:
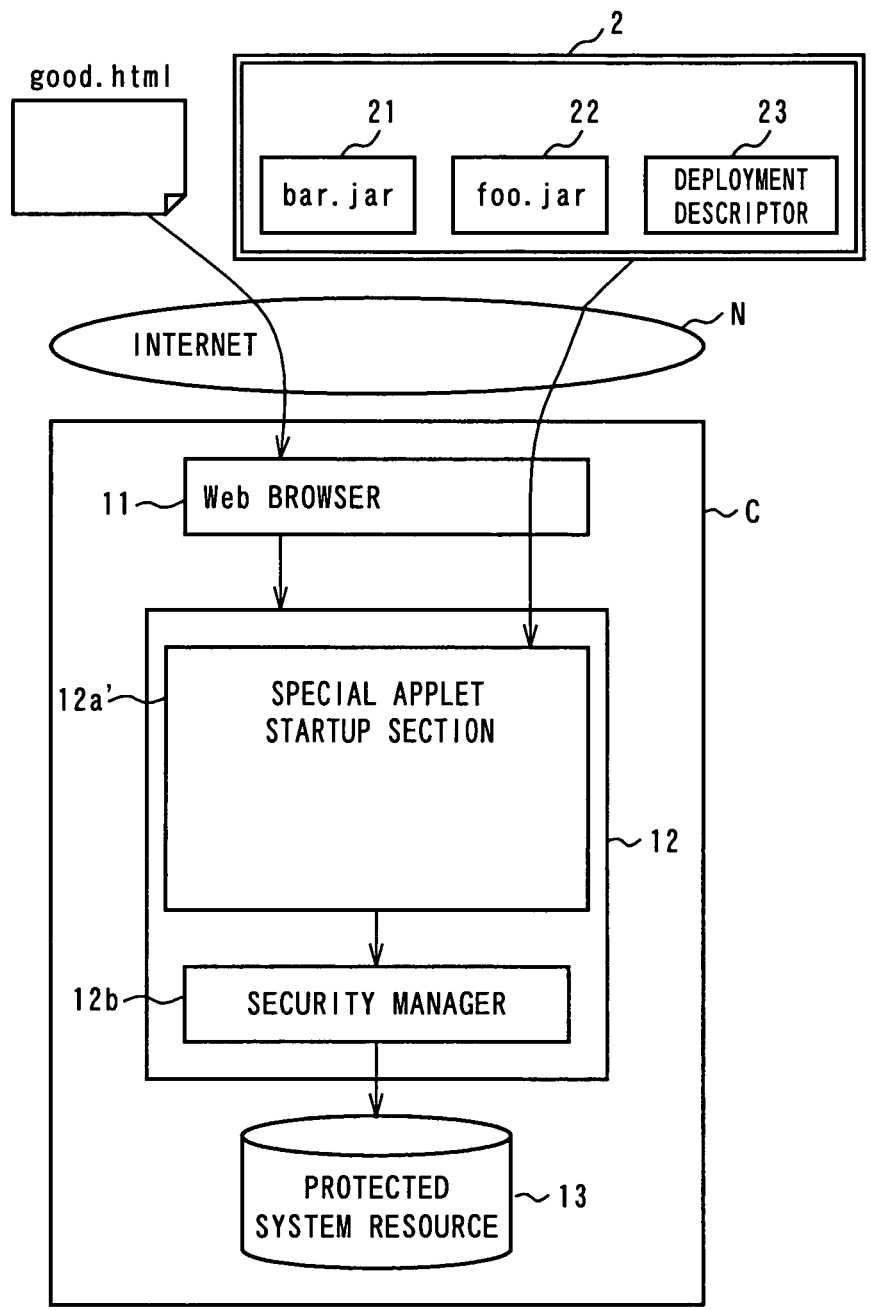
FIG. 20 is a view for explaining a configuration in which other applets and the like are deployed in advance inside a client terminal C.
Figure 21:
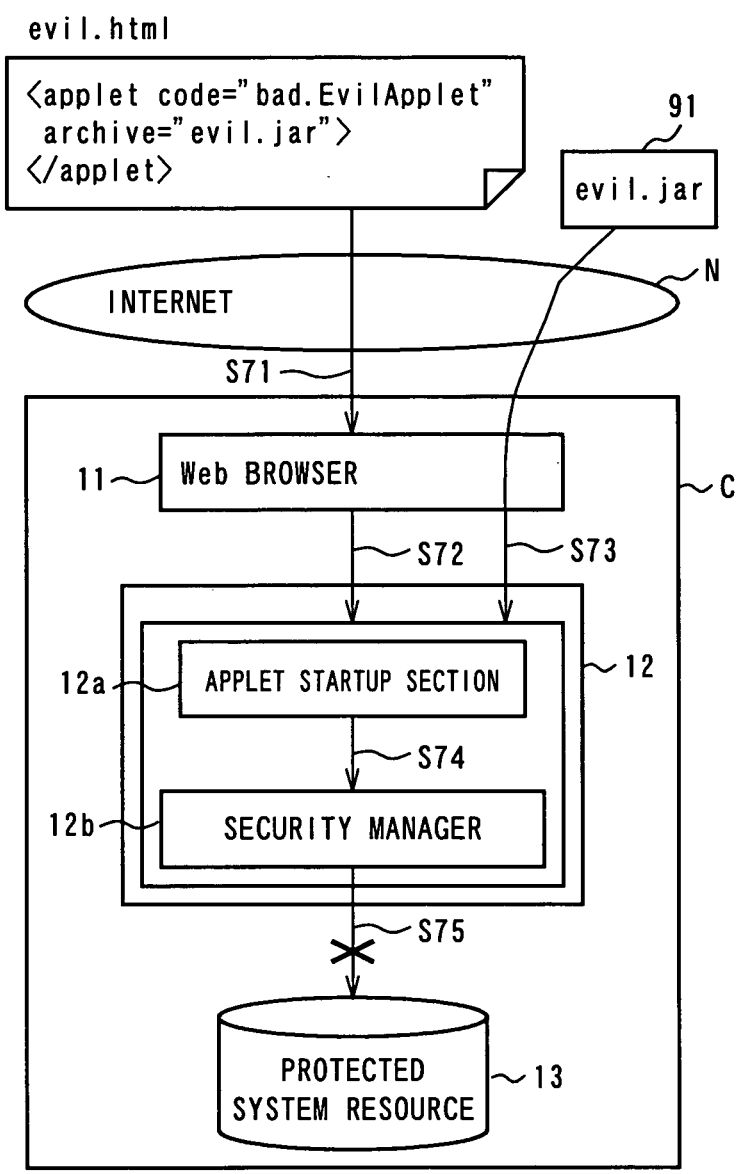
FIG. 21 is a conceptual view for depicting normal processing in case where an applet not electronically signed is executed.
Figure 22:
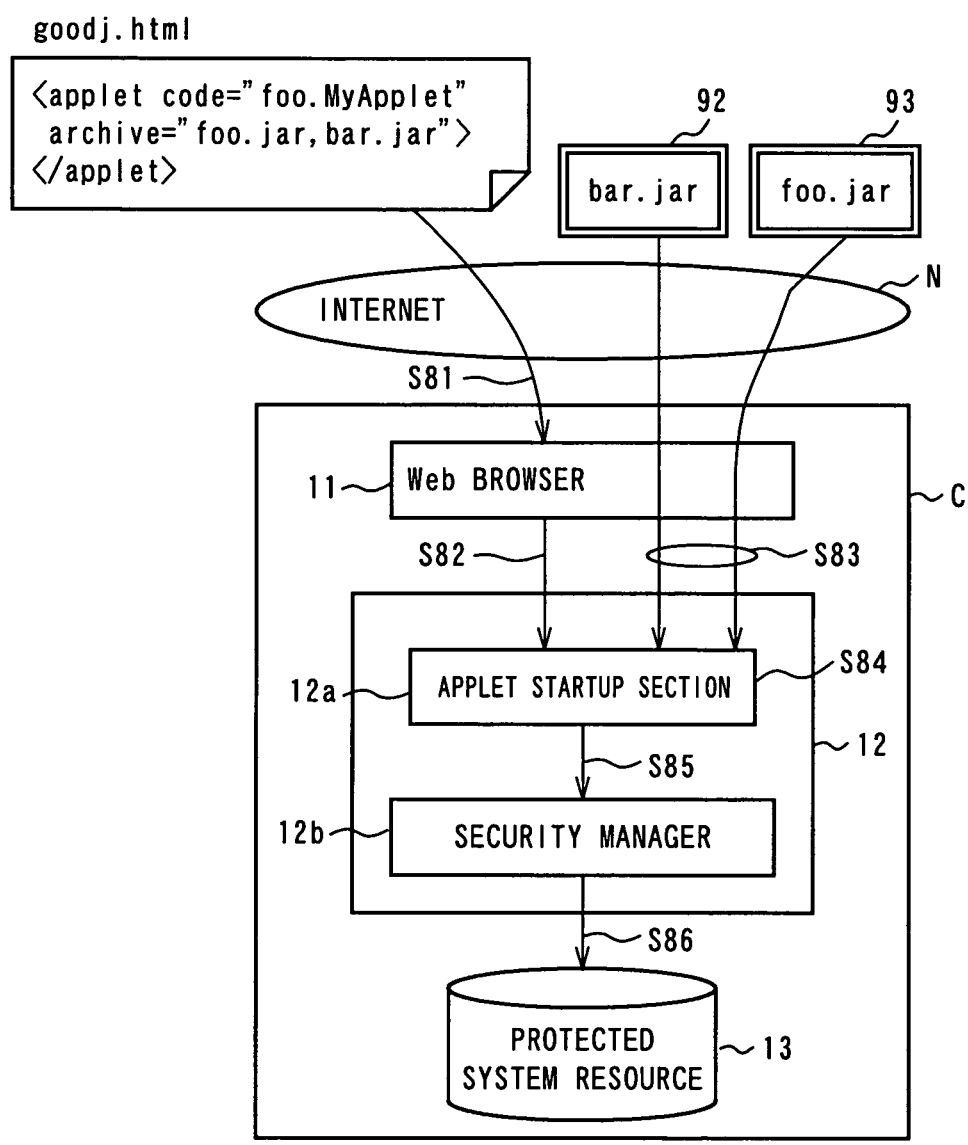
FIG. 22 is a conceptual view for depicting processing in case where an electronically signed applet is executed.

In addition to configurations as described above, another available configuration is (3) that among applets and the like which realize the function 12c for making applets be executed only in their proper structures, only data which should be deployed outside a client terminal C is deployed outside while the other data such as applets is deployed in advance inside the client terminal C (FIG. 20). This figure shows a state as follows. That is, a special applet startup section 12a' which functions as a load program and also as a startup program is realized by starting up applet programs and the like which are deployed in advance inside the client terminal C.

INDUSTRIAL APPLICABILITY

As described above, according to the present invention, electronically signed Java applets can be prevented simply and securely from being illicitly reused.

The invention claimed is:

1. A computer-readable non-transitory recording medium having recorded thereon an applet for causing a computer to execute a plurality of predetermined applet programs, the applet causes the computer to execute a process comprising:
   detecting alteration to deployment information based on identification information for detecting alteration to the deployment information, the deployment information defining respective locations of the plurality of predetermined applet programs by using at least one of a uniform resource locator (URL) of an applet program of an external server and a path of an applet program on a local disk of the computer;
   executing a start-up program to start a load program for loading the plurality of predetermined applet programs; and
   making the started load program load the plurality of predetermined applet programs based on the deployment information unless alteration is detected by the detecting, wherein
   one archive file includes the applet, the plurality of predetermined applet programs, and the deployment information,
   the applet of the archive file includes a package comprising the identification information, the load program, and the startup program as class files; and
   an electronic signature for certifying an origin of the archive file is attached to the archive file.

2. The computer-readable non-transitory recording medium according to claim 1, wherein the identification information includes a hash value of at least part of the deployment information.

3. The computer-readable non-transitory recording medium according to claim 1, wherein
   the identification information includes a hash value of each of the plurality of predetermined applet programs, and
   the step of detecting further comprises detecting alteration to each of the plurality of predetermined applet programs based on the identification information.

4. The computer-readable non-transitory recording medium according to claim 1, wherein the process further comprises, when a call request for calling a method from a main class of the applet is issued by using a script, transferring a method call processing based on the call request, to a method corresponding to the called method in the plurality of predetermined applet programs.

5. The computer-readable non-transitory recording medium according to claim 1, wherein the process further comprises setting an applet stub for the plurality of predetermined applet programs loaded.

6. An archive file generation method in which a computer performs processing for generating an archive file including an applet which causes the computer to execute a plurality of predetermined applet programs, wherein the computer executes:
   generating identification information for detecting alteration to deployment information, based on the deployment information, the deployment information defining respective locations of the plurality of predetermined applet programs by using at least one of a uniform resource locator (URL) of an applet program of an external server and a path of an applet program on a local disk of the computer; and
   generating an archive file based on the deployment information and the identification information, wherein
   the archive file includes the applet, the plurality of predetermined applet programs, and the deployment information,
   the applet of the archive file includes a package comprising the identification information, a load program for loading the plurality of predetermined applet programs, and a startup program for starting up the load program as class files; and
   an electronic signature for certifying an origin of the archive file is attached to the archive file.

7. The archive file generation method according to claim 6, wherein the identification information includes a hash value of at least part of the deployment information.

8. The archive file generation method according to claim 6, wherein the step of generating an archive file generates the archive file based on the deployment information, the identification information, and the plurality of predetermined applet programs.

9. The archive file generation method according to claim 8, wherein the identification information includes a hash value of each of the plurality of predetermined applet programs.

10. A computer-readable non-transitory recording medium having recorded thereon an archive file generation program that causes a computer to execute processing for generating an archive file including an applet which causes the computer to execute a plurality of predetermined applet programs, wherein the program causes the computer to execute a process comprising:
   generating identification information for detecting alteration to deployment information, the deployment information defining respective locations of the plurality of predetermined applet programs by using at least one of a uniform resource locator (URL) of an applet program of an external server and a path of an applet program on a local disk of the computer; and generating an archive file based on the deployment information and the identification information, wherein the archive file includes the applet, the plurality of predetermined applet programs, and the deployment information, the applet of the archive file includes a package comprising the identification information, a load program for loading the plurality of predetermined applet programs, and a startup program for starting up the load program as class files; and an electronic signature for certifying an origin of the archive file is attached to the archive file.

11. The archive file generation program according to claim 10, wherein the identification information includes a hash value of at least part of the deployment information.

12. The archive file generation program according to claim 10, wherein the step of generating an archive file generates the archive file based on the deployment information, the identification information and the plurality of predetermined applet programs.

13. The archive file generation program according to claim 12, wherein the identification information includes a hash value of each of the plurality of predetermined applet programs.

14. An archive file generation device that generates an archive file including an applet which causes a computer to execute a plurality of predetermined applet programs, the device comprising:

a recording medium; and a processor coupled to the recording medium, wherein the processor executes a program stored in the recording medium to perform a process including:

generating identification information based on deployment information, the deployment information defining respective locations of the plurality of predetermined applet programs by using at least one of a uniform resource locator (URL) of an applet program of an external server and a path of an applet program on a local disk of the computer; and generating an archive file based on the deployment information and the identification information, wherein the archive file includes the applet, the plurality of predetermined applet programs, the deployment information, the applet of the archive file includes a package comprising the identification information, a load program for loading the plurality of predetermined applet programs, and a startup program for starting up the load program as class files; and an electronic signature for certifying an origin is attached to the archive file.

15. The archive file generation device according to claim 14, wherein the identification information includes a hash value of at least part of the deployment information.

16. The archive file generation device according to claim 14, wherein the step of generating an archive file generates the archive file based on the deployment information, the identification information, and the plurality of predetermined applet programs.

17. The archive file generation device according to claim 16, wherein the identification information includes a hash value of each of the plurality of predetermined applet programs.

\* \* \* \* \*